United States Patent [19]

Riml

[11] Patent Number: 4,681,376

[45] Date of Patent: Jul. 21, 1987

[54] APPARATUS FOR TENSIONING A TRACK CHAIN OF A TRACKLAYING VEHICLE

[75] Inventor: Peter Riml, Mieming, Austria

[73] Assignee: Liebherr-Werk Telfs Ges m.b.H., Telfs, Austria

[21] Appl. No.: 836,384

[22] Filed: Mar. 5, 1986

[30] Foreign Application Priority Data

Mar. 5, 1985 [DE] Fed. Rep. of Germany ....... 3507805

[51] Int. Cl.⁴ .............................................. B62D 55/30
[52] U.S. Cl. .......................................... 305/10; 305/31
[58] Field of Search ......................... 305/10, 29, 31, 32

[56] References Cited

U.S. PATENT DOCUMENTS

| | | | |
|---|---|---|---|
| 3,647,270 | 3/1972 | Althaus | 305/10 |
| 3,901,563 | 8/1975 | Day | 305/10 |
| 3,910,649 | 10/1975 | Roskaft | 305/10 |
| 4,149,757 | 4/1979 | Meisel, Jr. | 305/31 X |

FOREIGN PATENT DOCUMENTS

| | | | |
|---|---|---|---|
| 2358386 | 6/1975 | Fed. Rep. of Germany | 305/10 |
| 0051672 | 4/1980 | Japan | 305/31 |
| 0007770 | 1/1982 | Japan | 305/10 |

*Primary Examiner*—Robert B. Reeves
*Assistant Examiner*—Russell D. Stormer
*Attorney, Agent, or Firm*—Fleit, Jacobson, Cohn & Price

[57] ABSTRACT

Apparatus for tensioning a track chain of a tracklaying vehicle, such as a bulldozer, crawler loader or excavator, including a hydraulic cylinder for biasing a reversing chain sprocket which is rotatably mounted in a bearing that is displaceable in the vertical center plane of the track chain. The hydraulic cylinder communicates with a cylinder chamber that contains a floating piston provided with a check valve for connecting the two parts of the chamber which are disposed on opposite sides of the piston, and for preventing backflow from the hydraulic cylinder. The piston is displaceable in the cylinder chamber between forward and rear stops to an extent which corresponds to that volume of hydraulic liquid which is to be displaced in order to relax the previously tensioned chain to an optimum chain tension. The cylinder chamber is connected adjacent to the rear stop to a supply line and adjacent to the front stop to a return line for returning fluid under a pressure corresponding to the pressure applied to tension the track chain. The supply line is connected to the reservoir when the piston has been moved into engagement with the forward stop.

10 Claims, 4 Drawing Figures

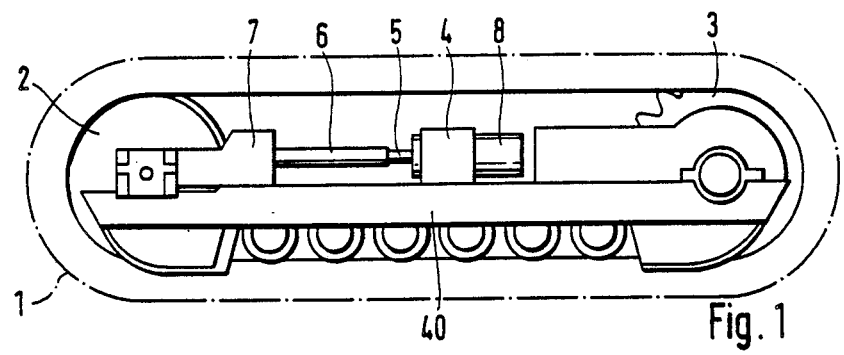
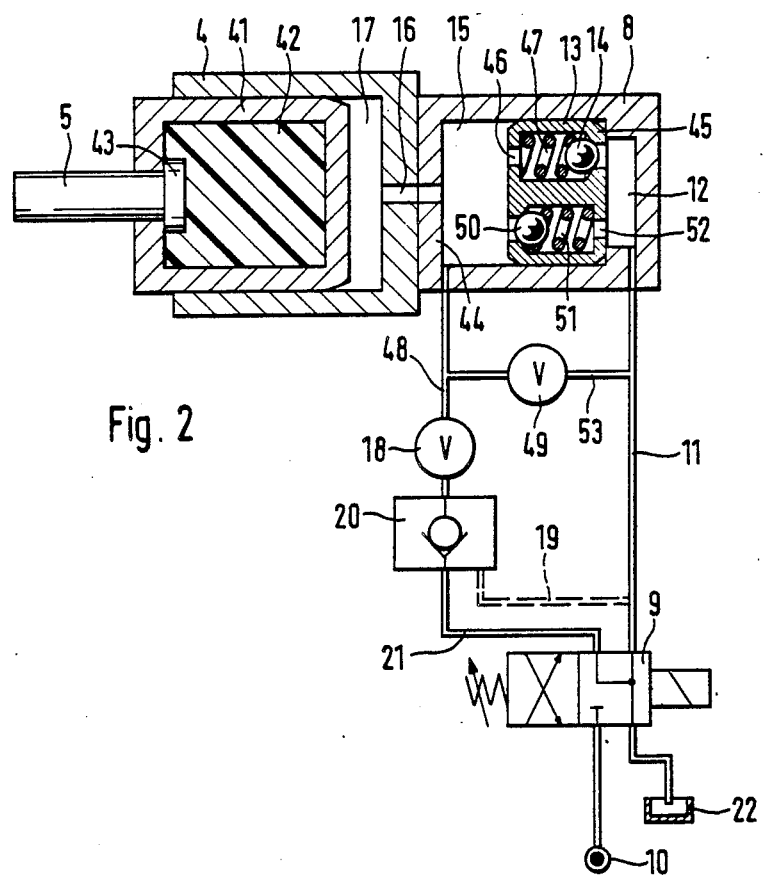
Fig. 1
Fig. 2

APPARATUS FOR TENSIONING A TRACK CHAIN OF A TRACKLAYING VEHICLE

BACKGROUND OF THE INVENTION

1. Field of the Invention

This invention relates to apparatus for tensioning a track chain of a tracklaying vehicle such as a bulldozer, crawler loader, or excavator, and more particularly to a hydraulic cylinder for biasing a reversing chain sprocket, which is rotatably mounted in a bearing that is displaceable in the vertical plane of the track chain.

2. Description of the Prior Art

In apparatus of the kind disclosed in U.S. Pat. No. 3,901,563, a hydraulic cylinder is supplied with fluid under the pressure that is required to tension to track chain. In order to avoid excessive tension in the chain, the hydraulic cylinder is connected by a relief valve and a check valve to a second cylinder chamber. The second cylinder chamber is filled with a fluid and contains a piston, which is biased by a prestressed spring, and which tends to urge the piston to a forward position defined by stop means. When the chain is under excessive tension, the pressure in the hydraulic cylinder rises above the normal pressure applied to tension the chain, and fluid will flow through the relief valve into the second cylinder chamber and will force the piston back so that the prestressed spring will be stressed further. When the tension in the chain decreases to below a normal value, the piston which is biased by the pressure of the prestressed spring forces fluid through the return valve back into the hydraulic cylinder until the spring has been moved into engagement with the stop means, which define the foremost position of the piston.

Published German Application 32 37 336 discloses track chain apparatus which includes control valve means for connecting a hydraulic cylinder to any of a plurality of relief valves so that the tension in the chain can be selected in dependence on different conditions of travel of the vehicle.

Although the known types of chain-tensioning apparatus can tension the chain in dependence on different operating conditions and can effect compensation for wear, a chain which is excessively tensioned during operation cannot be relaxed by the known apparatus to an optimum chain tension.

In apparatus of the kind described it is known that an optimum tension can be imparted to the chain if a chain-tensioning piston is associated with the hydraulic cylinder and is provided with a chamber that is filled with an elastomer and receives a plunger, which is connected to the piston rod that is used to bias the reversing chain sprocket so as to tension the chain. When it is desired to tension the chain, grease is manually pumped into the hydraulic cylinder until the movement of the piston rod of the plunger indicates that the chain tension has increased to a desired upper limit. To adjust the tension of the chain to an optimum value, the chain is subsequently relaxed in that grease is discharged through a manually operable valve. But that manual adjustment of the chain tension is complicated so that it is often omitted, and the grease or oil which has been discharged to relax the chain may fall on the soil, which is not desired.

For these reasons it is an object of the invention to provide track chain apparatus which is adapted to automatically adjust the claim to the optimum tension in dependence on the use and operating conditions of the vehicle.

SUMMARY OF THE INVENTION

Briefly stated, in accordance with one aspect of the present invention, track chain tensioning apparatus is provided that includes an hydraulic cylinder that communicates with a cylinder chamber containing a floating piston that is provided with a check valve for connecting the two parts of the chamber disposed on opposite sides of the piston, and for preventing backflow from the hydraulic cylinder. The piston is displaceable in the cylinder chamber between forward and rear stop means to an extent which corresponds to that volume of hydraulic liquid which is to be displaced in order to relax the previusly tensioned chain to an optimum chain tension. The cylinder chamber is connected adjacent to the rear stop means to a supply line, and adjacent to the front stop means to a return line for returning fluid under a pressure corresponding to the pressure applied to tension the track chain, and the supply line is connected to the reservoir when the piston has been moved into engagement with forward stop means.

By means of the apparatus in accordance with the invention the chain can be adjusted to the optimum tension under given operating conditions so that the tension of the chain is increased when it has an excessive slack, and so that the chain is relaxed when it is under an excessive tension. The chain may be under an excessive tension, e.g., when the vehicle is operated on loamy soil and dirt has built up on the wheels and has resulted in a higher chain tension. When the soil has been removed, e.g., during an operation on loose sand, the chain may become too slack. A slackening which necessitates a retensioning of the chain may also be the result of wear. By means of the apparatus in accordance with the invention the chain will always be exactly tensioned by the pressure which has built up in the cylinder chamber which contains the floating piston and which causes the chain to be under a predetermined over-tension. By the tensioning operation the floating piston is moved into engagement with the forward stop means. When the tension of the chain is at its upper limit, the floating piston is relieved so that it is moved into engagement with the rear stop means, and the chain is relaxed from a slightly excessive tension to an optimum chain tension.

When the apparatus in accordance with the invention is actuated when the chain is under an excessive tension, the differential pressure between the fluids on opposite sides of the floating piston causes the latter to move into engagement with the forward stop means, but this movement will not increase the tension of the chain. When the excessive tension of the chain equals the slightly excessive tension which is imparted to the chain in that the floating piston is moved into engagement with the forward stop means, fluid will be discharged from the hydraulic cylinder through the return line to the reservoir, so that in that case the predetermined slightly excessive tension will also be imparted to the chain. When the floating piston is subsequently relieved, it will move into engagement with the rear stop means so that the chain is also relaxed from its slightly excessive tension to the optimum chain tension. It is thus apparent that the apparatus in accordance with the invention will adjust the chain to an optimum tension regardless of the operating conditions and the actual tension of the chain.

The check valve which is provided in the floating piston is suitably biased by a spring so that a predetermined differential pressure will be obtained between the forward and rear sides of that piston, and that differential pressure will cause the floating piston to move into engagement with the forward stop means.

The supply and return lines may be connected to a directional control valve, which will connect the supply line to the reservoir and will thus relieve the floating piston when it has been moved into engagement with the forward stop means.

The return line suitably contains a throttle valve and a check valve, and the latter is connected to the supply line by a control line for opening the check valve in response to a pressure which exceeds the chain-tensioning pressure.

In another embodiment of the invention, a pressure control valve is provided for supplying fluid through a check valve to the supply line and the supply line, is connected to the reservoir by a throttle valve. In that embodiment the chain-tensioning apparatus can be supplied with the fluid used in the brake release, for example, and the pressure of that fluid can be increased for a short time if fluid is supplied to the apparatus through the pressure control valve.

When the chain is to be replaced because it has become excessively worn, the reversing chain sprocket must be moved toward the driving chain sprocket. For this reason, in another embodiment of the invention the forward cylinder chamber of the additional hydraulic cylinder, i.e., that chamber thereof which is nearer to the chain-tensioning hydraulic cylinder, communicated with the reservoir through a line which is provided with a shut-off valve.

Soil which has deposited on the chain and similar influences may result in an excessive tension of the chain. In a further embodiment of the invention, a safety feature is provided in that the floating piston has a relief valve which opens a return flow path from the forward cylinder chamber to the reservoir when the pressure in the forward cylinder chamber rises above an upper limit.

BRIEF DESCRIPTION OF THE DRAWINGS

FIG. 1 is a diagrammatic side elevation showing a tracklaying undercarriage and apparatus for tensioning a track chain.

FIG. 2 is a diagrammatic view showing a chain-tensioning hydraulic cylinder and the cylinder chambers and valves associated with the tensioning cylinder.

DETAILED DESCRIPTION OF THE PREFERRED EMBODIMENTS

Figure 3:
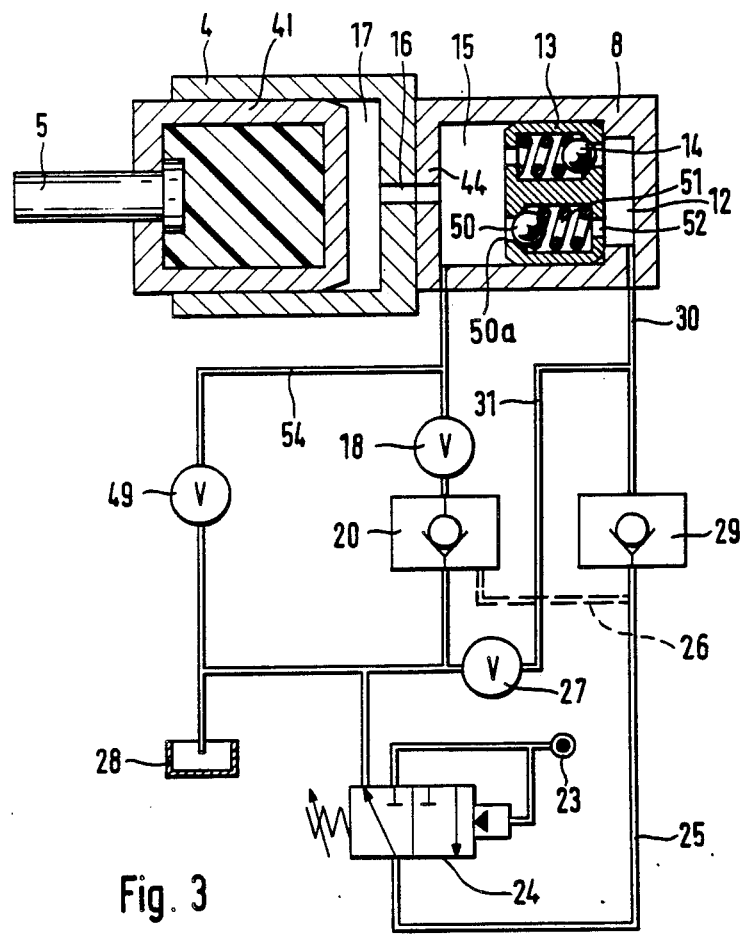
FIG. 3 is a diagrammatic view showing a second embodiment of a chain-tensioning hydraulic cylinder and a cylinder chamber and valves which are associated with the tensioning cylinder.

Illustrative embodiments of the invention will be described in more detail with reference to the drawings.

In a tracklaying undercarriage as shown in FIG. 1, each of two tracklaying frames dispoed on opposite sides of a tracklaying vehicle includes a drive sprocket 3, which is connected to a suitable source of power (not shown), a reversing chain sprocket 2, and an endless track chain 1, which passes around the two sprockets 2 and 3. The reversing chain sprocket 2 is rotatably mounted in a forked bearing bracket 7, which is slidably mounted on a central beam 40 of the tracklaying frame. A chain-tensioning hydraulic cylinder 4 is secured to the beam 40 and has a piston rod 5, which carries a ram 6 that is connected to the bearing bracket 7 in order to displace the same and thereby vary the tension in the chain 1.

As is apparent from FIG. 2, the cylinder 4 contains a chain-tensioning piston 41, which includes an inner chamber 42, which is filled with an elastomer. The piston rod 5 is movable into and out of chamber 42 and is connected to a plunger 43, which extends into the chamber 42. The interior of the cylinder 4 communicates through a passage 16 with the interior of an additional cylinder 8, which contains a floating piston 13 displaceable between a forward stop 44 and a rear stop 45. The piston 13 is formed with a through bore 46, which contains a check valve 14 biased by a compression spring 47 to close bore 46 at one end thereof. The floating piston 13 divides the interior of the cylinder 8 into a rear cylinder chamber 12 and a forward cylinder chamber 15. A supply conduit 11 opens into the rear cylinder chamber 12. The forward cylinder chamber 15 is connected to a return conduit 48, which is connected to conduit 21 through a throttle valve 18 and a check valve 20. Conduit 21 is adapted to be connected to a reservoir 22 by means of a directional control valve 9, which can be electrically or mechanically operated. Control valve 9 is also adapted to selectively connect supply conduit 11 to a port 10, connected to a suitable source of pressurized hydraulic fluid (not shown), for supplying hydraulic fluid under pressure, and alternately to the fluid reservoir 22. The check valve 20 is connected to conduit 11 by a control conduit 19 and opens when a chain-tensioning hydraulic pressure is applied through the supply conduit 11 and control conduit 19.

A slightly excessive tension can be imparted to track chain 1 by supplying pressurized hydraulic fluid from the pressure port 10 through the directional control valve 9 to the supply line 11. As a result, the check valve 14 in floating piston 13 is opened, as is check valve 20, and piston 13 is displaced in the cylinder 8 toward the forward stop 44 by virtue of the differential pressure within cylinder 8 caused by throttle valve 18. When the chain-tensioning piston 41 has moved to the left in FIG. 2 and has reached its chain-tensioning, forward position, excess hydraulic fluid flows back to the reservoir 22 through the throttle valve 18, the check valve 20, and the directional control valve 9. The directional control valve 9 is subsequently actuated to move to the position shown in FIG. 2 to interrupt the supply of pressurized fluid to conduit 11 and to connect conduit 11 with the reservoir 22. The pressure drop in conduit 19 causes the check valve 20 to close.

When the next foward or rearward travel of the vehicle is then initiated, the chain-tensioning piston 41 pushes back the floating piston 13 into engagement with the rear stop 45 in the cylinder 8. By its return movement, the piston 13 displaces a sufficiently large volume of fluid so that the chain is relaxed from its slightly excessive tension to an optimum tension condition.

Certain known tracklaying undercarriages are provided with hydraulic systems serving, e.g., to drive the track chains or to release the brakes. In the embodiment shown in FIG. 3 a pressurized fluid port 23 is connected, e.g., to the pressure line leading to a brake solenoid. When it is desired to tension the chain by means of the cylinders 4 and 8, the pressure of the fluid supplied to the port 23 is temporarily increased, e.g., from a brake-releasing pressure of 25 bars to a pressure of 50 bars. In response to that higher pressure, the pressure control valve 24, which is normally connected to the reservoir 28 is actuated. When the valve 24 has been actuated, hydraulic fluid undr a pressure of, e.g., 50 bars is supplied through conduit 25, the check valve 29 and conduit 30 to the cylinder 8.

When the pressure of the hydraulic fluid supplied to the port 23 has been increased, the hydraulic oil flows through the pressure conduit 25, the check valve 29 and the conduit 30 into the rear chamber 12 of the cylinder 8. The spring biased check valve 14 of the floating piston 13 is opened and the piston is moved toward the forward stop 44 so that hydraulic oil is displaced from the forward chamber 15 through the passage 16 into the cylinder chamber 17. As a result, the piston 41 and the piston rod 5 are actuated to displace the chain sprocket 2 in a chain-tensioning direction. When the floating piston 13 has reached its left most forward end position as viewed in FIG. 3, the hydraulic oil flows through the check valve 14 into the chamber 15 and through the throttle valve 18 and the check valve 20, which has opened in response to the pressure in the control conduit 26, into the reservoir 28. When the pressure in the pressure port 23 is subsequently reduced, the chamber 12 is connected to the reservoir 28 through conduits 30, 31 and the throttle valve 27, and the check valve 20 closes in response to the pressure drop in the control conduit 26. The piston 13 can now move back until it engages the rear stop 45 so that the tension of the chain is decreased to a predetermined degree in the manner which has been described. As a result of such relaxation, the chain has between the reversing chain sprocket and a next adjacent chain-supporting roller, between adjacent chain-supporting rollers, and between the last chain-supporting roller and the driving chain sprocket, the slackness which is required for a proper operation of the chain. That uniform slackness of the chain corresponds to a certain chain tension and will be maintained until the chain tension is readjusted to the the proper value by the hydraulic systems.

Figure 4:
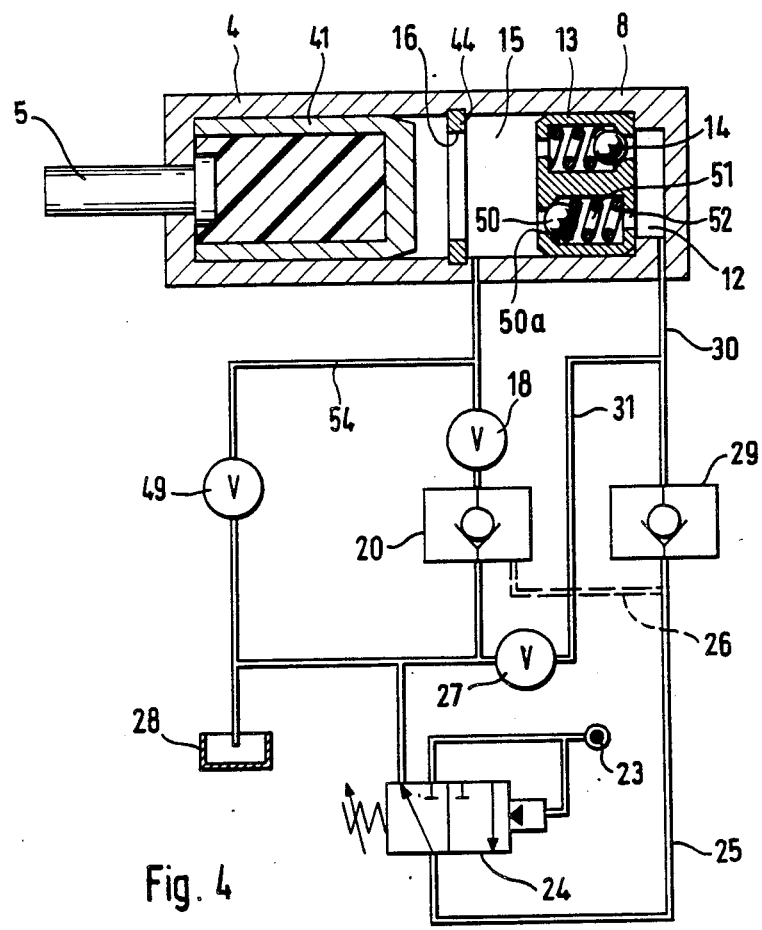
FIG. 4 is a view that is similar to FIG. 3 and shows an embodiment in which the chain-tensioning hydraulic cylinder and the associated cylinder chamber are combined in a single cylinder structure.

In the embodiment shown in FIG. 4, which is similar to the embodiment of FIG. 3, the cylinders 4 and 8 are combined to form a common cylinder and the forward stop 44 for the floating piston 13 is in the form of a stop ring.

As is apparent from FIGS. 2 to 4, the forward cylinder chambers 15 of the additional cylinders 8 are connected to the reservoir 22 through conduits 53 and 11 (FIG. 2) and to the reservoir 28 through conduit 54 (FIGS. 3 and 4), which contain shut-off valves 49, so that oil can flow back from the forward cylinder chamber 15 to the reservoir when shut-off valve 49 is open. In that condition, that is when valve 49 is open, the reversing chain sprocket 2, the piston 5 and the piston 41 can be displaced toward the drive sprocket shaft 3 as is required, e.g., for a replacement of the chain.

To prevent excessive tension of the chain, the floating piston 13 contains a relief valve 50a, which includes a valve ball 50 and a spring 51, which biases the valve ball 50, which can be, for example, one or more Belleville springs. If excessive chain tension causes the pressure of the hydraulic oil in the forward cylinder chamber 15 to exceed an upper limit, relief valve 50a will open so that the fluid can flow back from the forward cylinder chamber 15 to the reservoir through the relief valve 50a and through a relief passage 52 of the floating piston 13, and the tension in the chain will thus be relaxed.

Although particular embodiments of the invention have been illustrated and described, it will be apparent to those skilled in the art that various changes and modifications can be made without departing from the spirit of the present invention, and it is intended to encompass within the appended claims all such changes and modifications that fall within the scope of the present invention.

What is claimed is:

1. Apparatus for tensioning a track chain of a tracklaying vehicle such as a bulldozer, crawler loader, or excavator, said apparatus comprising: a tracklaying undercarriage including a frame and a track chain carried on said frame; drive chain sprocket means rotatably carried on said frame for driving said chain; reversing chain sprocket means with which said track chain is engaged; a hydraulic cylinder for biasing said reversing chain sprocket, which is rotatably mounted in a bearing that is displaceable in a vertical center plane that passes through the track chain, and hydraulic cylinder biasing said reversing chain sprocket to selectively tension and release the tension in the track chain and including a first cylinder chamber and a second cylinder chamber in fluid communication with said first cylinder chamber, a floating piston slidably received in said second cylinder chamber and including a check valve for connecting two parts of said second chamber which are disposed on opposite sides of the piston and for preventing backflow from said first cylinder chamber, the piston being displaceable in said second cylinder chamber between forward and rear stop means at respective ends thereof to an extent which corresponds to a volume of hydraulic liquid which is to be displaced in order to relax a previously tensioned chain to an optimum chain tension, said second cylinder chamber connected adjacent to the rear stop means to a supply conduit and adjacent the front stop means to a return conduit for returning fluid under a pressure corresponding to the pressure applied to tension the track chain, and valve means for connecting said supply conduit to a fluid reservoir when the piston has been moved into engagement with the forward stop means.

2. Apparatus according to claim 1, wherein the check valve provided in the floating piston is biased by spring means.

3. Apparatus according to claim 1, wherein said valve means include a directional control valve and supply and return conduits are connected to said directional control valve, to connect the supply conduit to a reservoir to relieve pressure on the floating piston when it has been moved into engagement with the forward stop means.

4. Apparatus according to claim 3, wherein said return conduit includes a throttle valve and a return check valve, and said return check valve is connected to the supply conduit by a control conduit for opening the check valve in response to a pressure in said supply conduit which exceeds a predetermined chain-tensioning pressure.

5. Apparatus according to claim 1, including a pressure control valve and a supply check valve in said supply conduit for supplying fluid through said supply check valve to the supply conduit, and the supply conduit is connected to a reservoir through a throttle valve at a point downstream of said supply check valve.

6. Apparatus according to claim 1, wherein said first and second cylinder chambers are separated by a stop ring.

7. Apparatus according to claim 1, wherein said chain-tensioning cylinder includes a hollow, chain-tensioning piston in said first cylinder chamber, and said hollow piston contains an elastomer, and a plunger extends into said hollow piston and is connected to said reversing chain sprocket through a connection means for biasing the reversing chain sprocket.

8. Apparatus according to claim 1, wherein one of the forward and rear stop means associated with the chain-tensioning piston is adjustable.

9. Apparatus according to claim 1, wherein a forward cylinder chamber of the second cylinder chamber communicates with the reservoir through a conduit having a shut-off valve.

10. Apparatus according to claim 1, wherein the floating piston includes relief valve means for opening a return flow path from a forward cylinder chamber to the reservoir when the pressure in the forward cylinder chamber rises above a predetermined upper limit.

* * * * *